W. YAMADA & G. K. SUZAKI.
WINDOW CLEANING ATTACHMENT.
APPLICATION FILED JUNE 21, 1915.
1,162,122.
Patented Nov. 30, 1915.
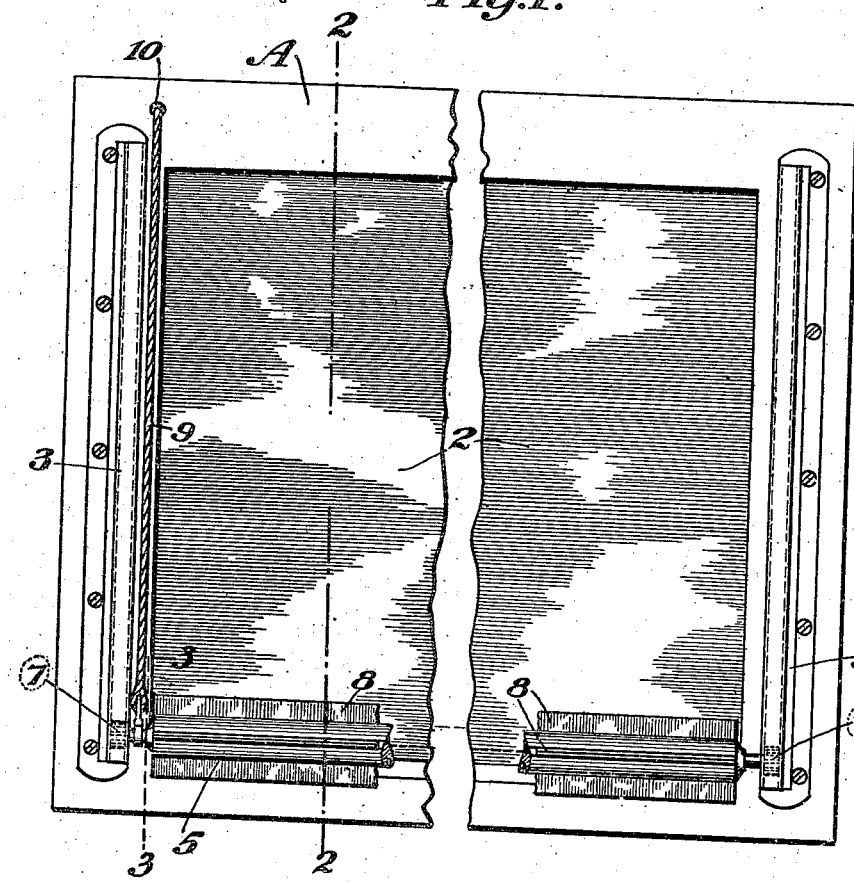
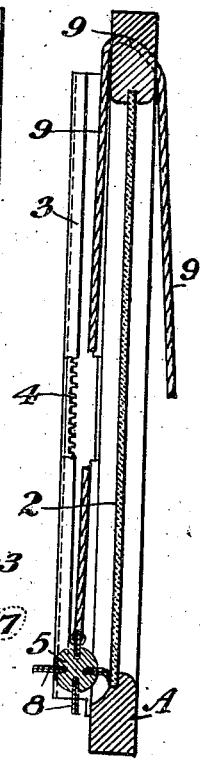
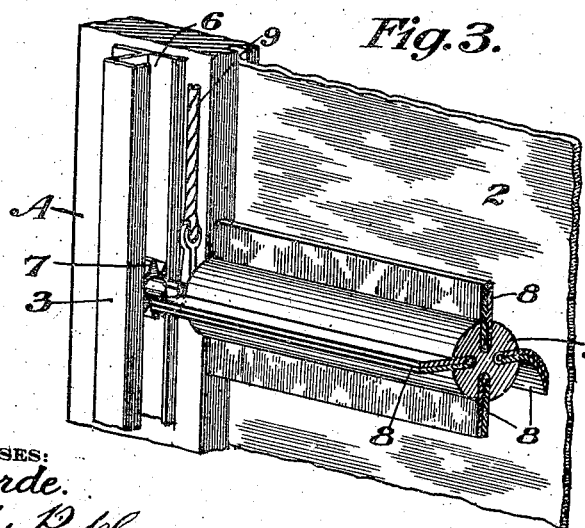
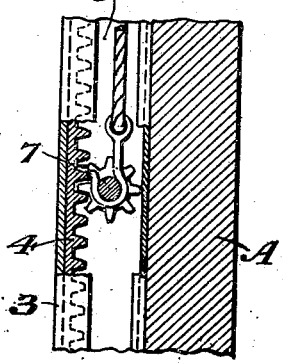
WITNESSES:
L. J. Forde.
Charles Rokles
INVENTORS
William Yamada.
George K. Suzaki.
By Strong & Townsend
ATTORNEYS.

UNITED STATES PATENT OFFICE.

WILLIAM YAMADA AND GEORGE K. SUZAKI, OF OAKLAND, CALIFORNIA.

WINDOW-CLEANING ATTACHMENT.

1,162,122.  Specification of Letters Patent.  Patented Nov. 30, 1915.

Application filed June 21, 1915. Serial No. 35,473.

*To all whom it may concern:*

Be it known that we, WILLIAM YAMADA and GEORGE K. SUZAKI, subjects of the Emperor of Japan, residing at Oakland, in the county of Alameda and State of California, have invented new and useful Improvements in Window-Cleaning Attachments, of which the following is a specification.

This invention relates to a device for cleaning windows. It is especially designed for application to windows and glass which is exposed to rain, and which it is especially required to maintain clear for observation, and particularly to the wind shields of street cars and of automobiles, so that a clear vision may be had when driving.

The invention consists of a flexible revoluble wiper, journaled and traveling in guides upon each side and exterior to the glass, so that it may be caused to travel and at the same time be revolved in contact with the glass, to wipe and keep it clean.

Referring to the drawings for a more complete explanation of this invention: Figure 1 is a front elevation of the attachment applied to a framed glass. Fig. 2 is a section through 2—2, Fig. 1. Fig. 3 is a perspective view of a part of the device. Fig. 4 is an enlarged section through 3—3 of Fig. 1.

It is often necessary to wipe glazed surfaces to keep them clear of moisture, so that vision through the glass may not be interrupted or dimmed, and this is especially necessary in street cars and automobiles.

As shown in the drawings, A is the frame having the transparent glass 2 set therein. Upon each side of the frame are fixed guides 3, within which are rack bars 4. The bar 5 extends transversely across the front of the glass, and its ends pass through the slots 6 in the guide bars, and are fixed in the pinions 7, which engage the teeth of the rack bars within the guides. The bar 5 may be made in segments, slotted lengthwise, or otherwise so formed as to receive the flexible wipers 8, which as shown in the present case, radiate outward from holding slots in the bar; and the free outer edges are caused to move over the glass, and wipe it when the bar is caused to travel and revolve over the glass.

At one end of the bar 5 contiguous to its reduced journal which passes through the guiding slot 6, a hook or equivalent suspending link is connected with the journal shaft and a cord chain or strap 9 extends upwardly therefrom and through a guide opening 10 in the frame A, to a point within easy reach of the operator. When this connection is pulled, the shaft or bar 5 will be raised and revolved by the action of the pinions 7, which turning in engagement with the rack bars, cause the bar 5 to revolve and travel evenly over the surface.

The wipers may be of rubber or of some flexible absorbent material, and the circumferential distance of travel, being so much greater than that of the pinions will cause a correspondingly more rapid travel of the edges, and a thorough cleansing of the glass.

It will only be necessary to pull upon the cord to cause the wipers to revolve and travel upward against the glass, and when this pull is relaxed the device will move downward by gravitation, revolving and wiping in both directions.

Having thus described our invention, what we claim and desire to secure by Letters Patent is—

In combination with a window frame having a top opening, a guide on each side of the frame, a roller having pinions on its ends received in the guides, racks in the guides, and a flexible element having means on one end rotatably supporting one end of the roller by hooked engagement therewith and having its opposite end threaded through said window frame opening, each of said guides having its top and its bottom open and said hooked means being adapted for instantaneous disengagement from the roller and the flexible element being adapted for like disengagement from the frame, whereby to allow the roller to be instantly removed or replaced through and from either the tops or the bottoms of the guides and the flexible element to be removed from the roller and window frame.

In testimony whereof we have hereunto set our hands in the presence of two subscribing witnesses.

WILLIAM YAMADA.
GEORGE K. SUZAKI.

Witnesses:
JOHN H. HERRING,
W. W. HEALEY.

Copies of this patent may be obtained for five cents each, by addressing the "Commissioner of Patents, Washington, D. C."